United States Patent
Bell

(10) Patent No.: US 9,241,075 B2
(45) Date of Patent: Jan. 19, 2016

(54) ALARM SYSTEM CALL HANDLING

(75) Inventor: Dwayne Arthur Bell, Zephyr (CA)

(73) Assignee: TYCO SAFETY PRODUCTS CANADA LTD., Concord (CA)

( * ) Notice: Subject to any disclaimer, the term of this patent is extended or adjusted under 35 U.S.C. 154(b) by 750 days.

(21) Appl. No.: 12/738,503

(22) PCT Filed: Oct. 17, 2007

(86) PCT No.: PCT/CA2007/001830
§ 371 (c)(1),
(2), (4) Date: Apr. 16, 2010

(87) PCT Pub. No.: WO2009/049394
PCT Pub. Date: Apr. 23, 2009

(65) Prior Publication Data
US 2010/0215154 A1    Aug. 26, 2010

(51) Int. Cl.
| | |
|---|---|
| H04M 11/04 | (2006.01) |
| G08B 25/08 | (2006.01) |
| H04M 3/436 | (2006.01) |
| H04M 19/04 | (2006.01) |
| H04L 12/66 | (2006.01) |

(52) U.S. Cl.
CPC ............... *H04M 11/04* (2013.01); *G08B 25/08* (2013.01); *H04M 3/436* (2013.01); *H04M 19/041* (2013.01)

(58) Field of Classification Search
CPC ... H04M 11/066; H04M 1/723; H04M 1/725; H04M 1/78
USPC ...................................... 379/49, 88.01–88.19
See application file for complete search history.

(56) References Cited

U.S. PATENT DOCUMENTS

| | | | | |
|---|---|---|---|---|
| 3,626,098 | A | * | 12/1971 | Lee ................................. 379/40 |
| 5,530,945 | A | * | 6/1996 | Chavez et al. ................. 455/411 |
| 5,812,054 | A | | 9/1998 | Cohen |
| 5,940,474 | A | | 8/1999 | Ruus |
| 6,442,264 | B1 | * | 8/2002 | Sutter ....................... 379/142.07 |
| 6,707,909 | B1 | * | 3/2004 | Inoue ........................ 379/387.02 |
| 6,825,762 | B2 | | 11/2004 | Giacopelli et al. |
| 6,990,321 | B1 | * | 1/2006 | Peters ........................... 455/74.1 |
| 7,848,505 | B2 | | 12/2010 | Martin et al. |
| 8,036,344 | B2 | * | 10/2011 | Frenette .......................... 379/52 |

(Continued)

FOREIGN PATENT DOCUMENTS

| | | |
|---|---|---|
| EP | 1 826 997 A1 | 8/2007 |
| EP | 1833031 A2 | 9/2007 |

OTHER PUBLICATIONS

International Search Report for PCT International Application No. PCT/CA2007/00830 mailed Jul. 17, 2008.

(Continued)

*Primary Examiner* — Solomon Bezuayehu

(57) ABSTRACT

An alarm system that monitors and selectively handles incoming telephone calls at a premises in disclosed. The alarm system includes, a telephone network interface, for receiving a subscriber line from a telephone network that further includes a caller-ID decoder for decoding caller-ID information for telephone calls received on said subscriber line; and a switch for selectively interconnecting said subscriber line to a telephone feed at the premises. A processor is in communication with the caller-ID decoder and the switch to selectively interconnect calls from the subscriber line to the telephone feed at the premises, based on associated caller-ID information.

19 Claims, 6 Drawing Sheets

(56) References Cited

U.S. PATENT DOCUMENTS

| | | | |
|---|---|---|---|
| 8,654,943 B2* | 2/2014 | Pearson et al. | 379/93.23 |
| 2001/0050976 A1 | 12/2001 | Simon et al. | |
| 2006/0226971 A1 | 10/2006 | Petricoin et al. | |
| 2008/0037741 A1* | 2/2008 | Bear et al. | 379/142.01 |
| 2009/0305695 A1* | 12/2009 | Bear et al. | 455/426.1 |
| 2011/0069824 A1* | 3/2011 | Martin | 379/142.04 |

OTHER PUBLICATIONS

EPO Communication, Extended European Search Report issued on Mar. 30, 2012 in related European patent application No. 07815981.1.

* cited by examiner

ALARM SYSTEM CALL HANDLING

FIELD OF THE INVENTION

Related Applications

This application is a national filing of International Application No. PCT/CA2007/001830, filed on Oct. 17, 2007, entitled "ALARM SYSTEM CALL HANDLING", the contents of which are hereby incorporated herein by reference.

The present invention relates generally to telephone call management and more particularly to incoming telephone call handling, and alarm systems facilitating selective telephone call handling.

BACKGROUND OF THE INVENTION

Since its introduction, the telephone has been used as a marketing instrument, and often it has served as an instrument for unsolicited advertisers. In recent years, such unsolicited "telemarketing" has become widespread, and annoying to many telephone subscribers.

Fortunately, the advent of digital telephony has given users and telephone companies the ability to limit the effectiveness of such calls. In particular, incoming telephone calls are now typically accompanied with calling party identification ("caller-ID") information. Telephone companies and equipment providers have allowed telephone subscribers to handle calls from unknown or unwanted callers.

For example, many telephone service providers now provide subscribers with a service that prevents unwanted incoming calls from ringing through to the subscriber's phone. A conventional call blocking service enables subscribers to maintain a blocked numbers list. Incoming calls that originate from any one of the listed numbers are prevented from ringing through to the subscriber's phone at the telephone company local office. Upon attempting to call the subscriber, a blocked caller will typically hear a pre-recorded message stating that the subscriber is not accepting the call. Typically, the call blocking service is provided by the telephone service provider for an additional monthly fee.

As an alternate to the telephone company services, an incoming call screening device may be attached at the customer premises (usually integrated into the telephone set). Typical call screening devices decode the caller-identification signal, which is sent over the local loop between the first and second ring signals of an incoming call, in order to ascertain the originating telephone number and block unwanted calls. These devices are advantageous because the user typically does not need to pay monthly fees. However, typical call screening devices block calls at individual telephone sets, thus premises with multiple telephone sets may require separate devices at each telephone set.

Accordingly, there is a need for improved call handling methods and devices.

SUMMARY OF THE INVENTION

In accordance with the present invention, incoming calls are handled at an alarm system.

In an embodiment, an alarm system monitors incoming telephone calls and selectively handles the incoming telephone calls. The alarm system includes, a telephone network interface, for receiving a subscriber line from a telephone network that further includes a caller-ID decoder for decoding caller-ID information for telephone calls received on said subscriber line; and a switch for selectively interconnecting said subscriber line to a telephone feed at the premises. A processor is in communication with the caller-ID decoder and the switch to selectively interconnect calls from the subscriber line to the telephone feed at the premises, based on associated caller-ID information.

In a further embodiment, a method of handling an incoming call at an alarm system at a premises, is provided. The alarm system is interconnected with a telephone network and a telephone feed to the premises. The method includes receiving, at the alarm system, an incoming telephone call from the telephone network; extracting, at the alarm system, caller-ID data associated with the telephone call; determining, at the alarm system, how to handle the call, based on the caller-ID data; and in response to the determining, handling the call at the alarm system, to selectively interconnect calls to the telephone feed at the premises.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
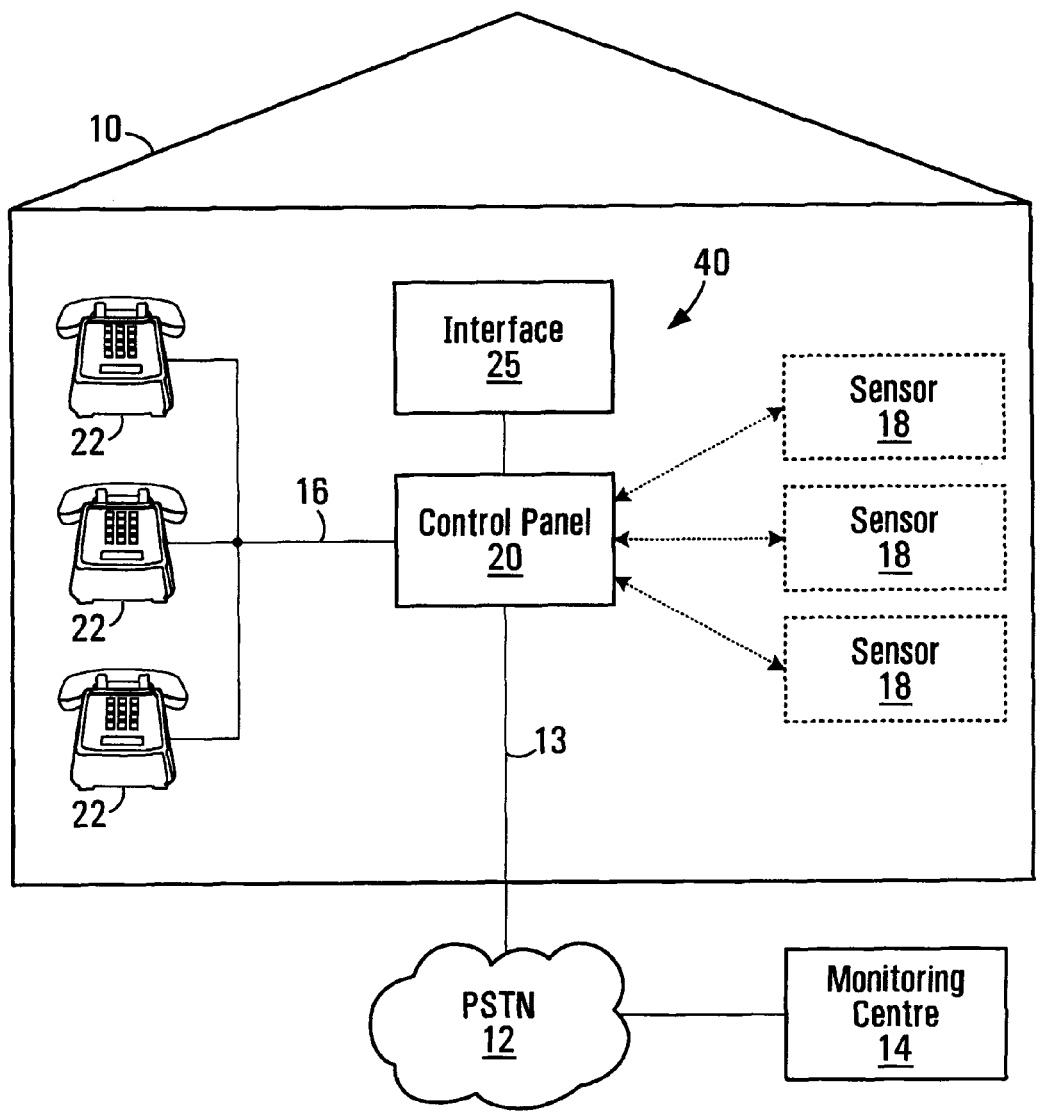
FIG. 1 is a schematic diagram of an alarm system at a monitored premises, exemplary of an embodiment of the present invention.

FIG. 1 depicts a residential or business premises 10 guarded by an alarm system 40, exemplary of an embodiment of the present invention. As will become apparent, alarm system 40 acts as a conventional alarm system, and further manages incoming phone calls in manners exemplary of embodiments of the present invention. Alarm system 40 includes a central control panel 20 in communication with a plurality of sensors 18. Sensors 18 may be entry sensors, motion sensors, flood sensors, smoke detectors, gas sensors, or any other sensors to be monitored, as appreciated by those of ordinary skill. Sensors 18 may be in communication with control panel 20 wirelessly, by a wired interconnect, through the electric wiring of premises 10, or otherwise. The alarm system may further include other user interfaces 25 in the form of one or more of a keypad, a display, a speaker, an electronic ringer, or the like.

Control panel 20 is interconnected with the public switched telephone network ("PSTN") 12 by a subscriber line 13. Subscriber line 13 terminates in a central office (not shown) of PSTN 12. A monitoring center 14 is also interconnected with the PSTN 12. Monitoring center 14 is depicted as a single monitoring station, however, as is appreciated by those of ordinary skill, monitoring center 14 could be formed of multiple monitoring stations, each at different physical locations. Monitoring center 14 is associated with one or more PSTN telephone numbers that may be used by control panel 20 to contact monitoring center 14.

Sensors 18 and control panel 20 interact in a conventional manner. As a particular sensor 18 is tripped signifying a sensed condition, the sensor provides a signal to control panel 20. Control panel 20, in turn, places a telephone call to a pre-programmed telephone number to contact monitoring center 14, typically by way of PSTN 12. As will be appreciated by those of ordinary skill, control panel 20 may include a further network interface (not shown) to contact monitoring center 14, by way of a cellular network or data network.

In order to ensure that control panel 20 has unfettered access to PSTN subscriber line 13, the wired telephone feed 16 providing telephone signals to the remainder of premises 10 (including telephones 22) is routed through control panel 20. As will become apparent, telephone feed 16 may be selectively disconnected from PSTN subscriber line 13 by, for example, a switch in the form of a relay or the like, as control panel 20 originates a call, as detailed below.

Figure 2:
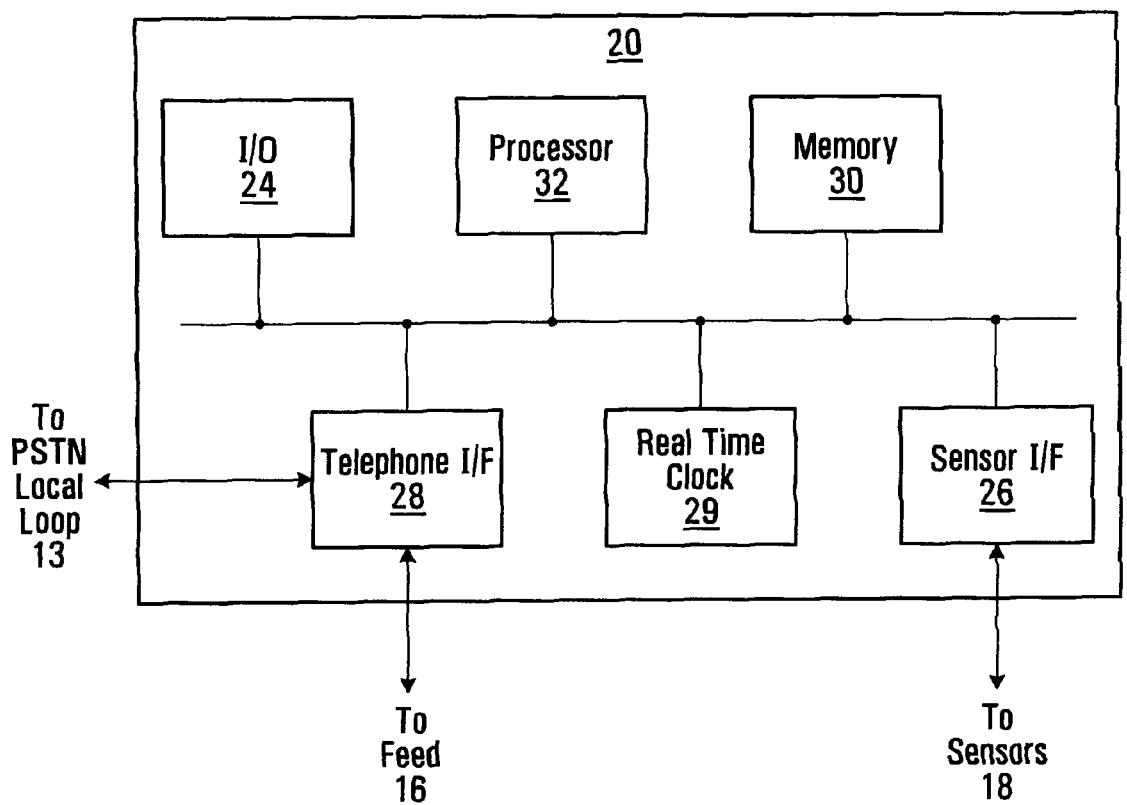
FIG. 2 is a schematic block diagram of a control panel of the system of FIG. 1.

Control panel 20 is more particularly illustrated in FIG. 2. As illustrated, control panel 20 includes a central processor 32 in communication with memory 30, input/output interfaces 24, sensor interface 26, and telephone network interface 28. Telephone network interface 28 is interconnected through telephone feed 16 to telephones 22 and provides an output suited for interconnection with PSTN subscriber line 13.

Input/output interfaces 24 may communicate with user interface 25 (FIG. 1), or include a display and a keypad to enable the customer to access system 40, and administer call handling features provided by control panel 20. Input/output interfaces 24 may also include an electronic ringer capable of generating distinctive ring tones, and/or a speaker. Input/output interfaces 24 may optionally further include other peripheral interfaces, such as a data network interface, and a home automation (power line control) interface. The power line control interface may, for example, take the form of an X10 compliant, or similar interface interconnected with the electric power line of premises 10. The power line control interface may further be capable of modulating control signal onto the electric power lines, in a conventional manner. These control signals may be used by interconnected peripherals such as lamp controllers, bells, alarms and the like to remotely respond to control signals placed on the power lines by the power line control interface.

A real-time clock 29 may provide a time signal to processor 32, allowing processor 32 to assess the current time of day, and/or date.

Software controlling the operation of processor 32, and hence control panel 20, may be embedded in processor 32 or may be stored in memory 30 external to processor 32.

Figure 3:
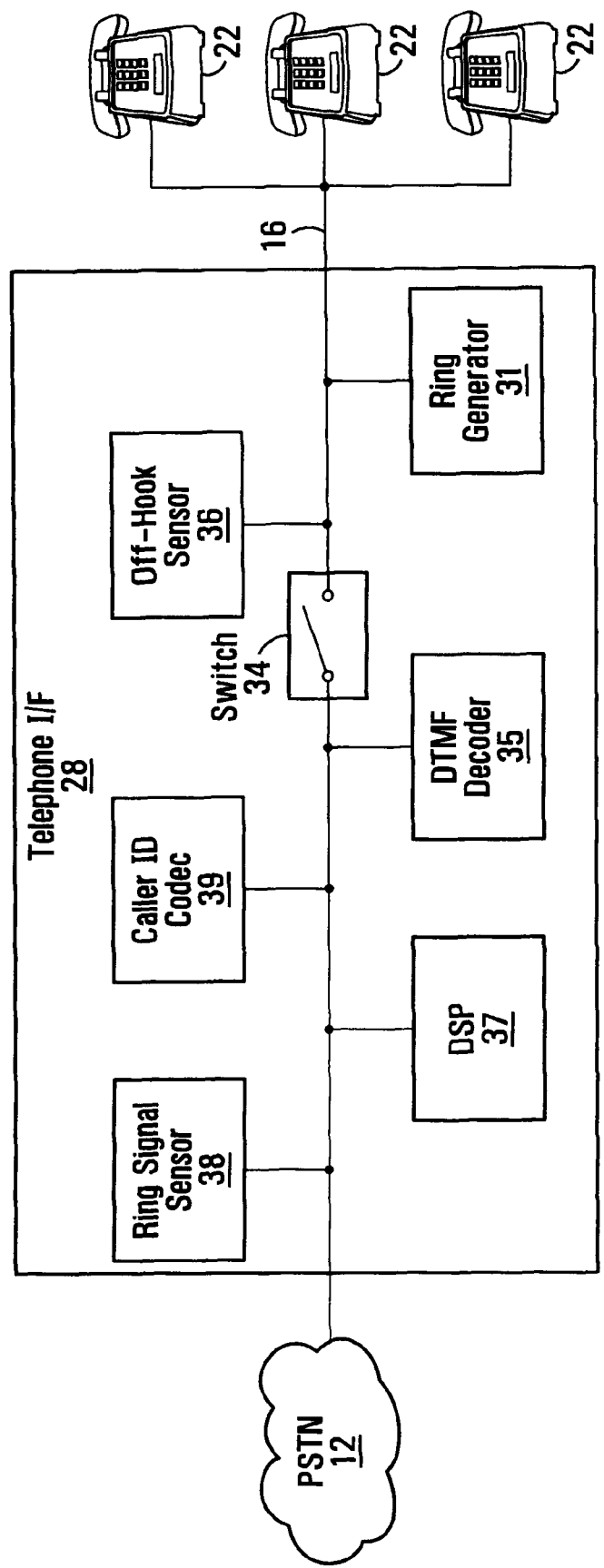
FIG. 3 is a schematic block diagram of a telephone interface module of the control panel of FIG. 2.

Telephone network interface 28 is more particularly illustrated in FIG. 3. As illustrated, telephone network interface 28 includes a switch 34 interposed between PSTN subscriber line 13 and telephone feed 16. Switch 34 is controllable by processor 32 (FIG. 2) to selectively connect or disconnect telephone feed 16 from PSTN subscriber line 13. Telephone network interface 28 further includes an off-hook sensor connected to telephone feed 16. Off-hook sensor 36 may include a current detector, suitable to detect a loop current that flows as a result of one or more interconnected telephones 22 (FIG. 1) being taken off-hook. Off-hook sensor 36 may further include a current source that may provide a small loop current when switch 34 is open. Thus, off-hook sensor 36 is capable of detecting off-hook conditions on telephone feed 16, when switch 34 is open or closed.

Telephone network interface 28 further includes a ring signal sensor 38 and a caller-ID decoder/encoder (CODEC) 39, both of which are connected to PSTN subscriber line 13. Ring signal sensor 38 monitors PSTN subscriber line 13 for a ring signal, the detection of which indicates an incoming call. When an incoming call is detected, caller-ID decoder/encoder 39 monitors PSTN subscriber line 13 for a caller-ID signal, accompanying an incoming call. As will be appreciated by those of ordinary skill, caller-ID information is typically transmitted digitally. In the U.S. and Canada, a caller-ID signal is modulated using Bell 202 modulation, between the first and second rings. In other countries other methods are also used. For example, other systems use a "line reversal" to announce the caller-ID. In Europe, the caller-ID signal is sometimes modulated using V.23 or the data is sent using DTMF signalling. In addition to decoding caller-ID signals, caller-ID encoder 39 can also encode provided data to provide a modulated caller-ID signal to feed 16.

Telephone network interface 28 further includes a digital signal processor (DSP) 37 capable of generating signals to be placed on subscriber line 13. DSP 37 under control of processor 32 (FIG. 2) may be capable of answering an incoming call at subscriber line 13, and generating a pre-recorded audio message to be provided to a far end caller, over subscriber line 13. DSP 37 under control of processor 32 may similarly place an outgoing call over subscriber line 13 by placing subscriber line 13 in an off-hook state, and placing a call by pulsing subscriber line 13, or generating a sequence of DTMF tones to place the call. DSP 37 may further act as a digital to analog (D/A) converter, in order to replay digitised audio over subscriber line 13, as described below.

Optionally, telephone network interface 28 may further include a DTMF decoder 35 that may decode DTMF tones received after an incoming call is answered.

Each of off-hook sensor 36, caller-ID decoder/encoder 39, ring generator 31; switch 34 and DTMF decoder 35 is in communication with processor 32 of panel 20. Specifically, off-hook sensor 36 may provide an indication of a sensed off-hook condition to processor 32; off-hook sensor 36 may further be controlled by processor 32 to generate a loop current on feed 16; caller-ID decoder/encoder 39 may decode the caller-ID signal to provide caller-ID data to processor 32; caller-ID decoder/encoder 39 under control of processor 32 may further generate a caller-ID signal on feed 16; optional ring generator 31 may generate a ring signal on feed 16, under control of processor 32. DTMF decoder 35 provides data corresponding to decoded DTMF tones to processor 32.

In manners exemplary of embodiments of the present invention, alarm system 40 under software control may use decoded caller-ID signal to facilitate call handling at premises 10.

Figures 4, 5:
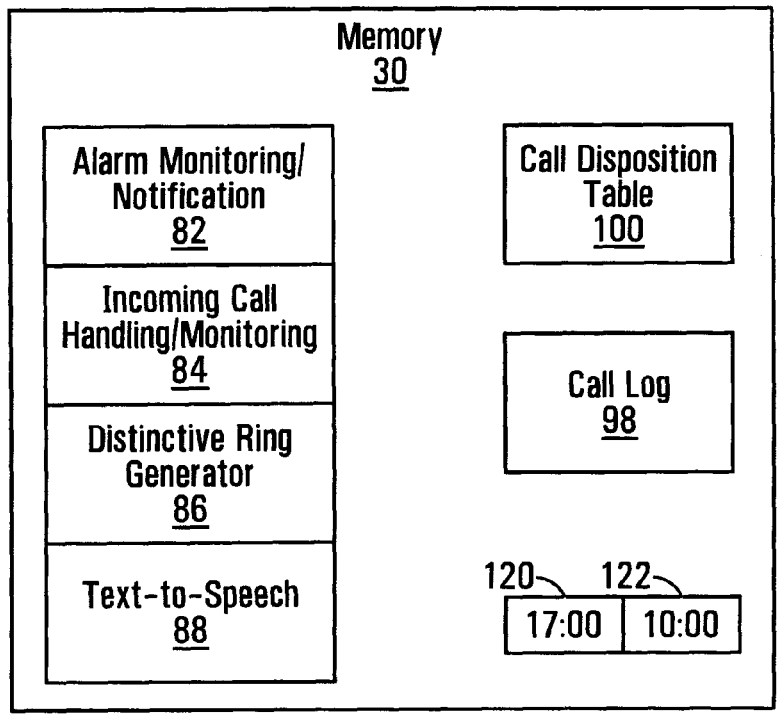
FIG. 4 is a simplified block diagram of the organization of memory at the control panel of FIG. 2.
FIG. 5 is a simplified block diagram of a table in the memory of FIG. 4.

To this end, an example organization of memory 30 is illustrated in FIG. 4. As illustrated, memory 30 stores an alarm monitoring/notification software component 82; incoming call monitoring/handling software component 84; a distinctive ring generator software component 86; and a text to speech software component 88. Memory 30 may further store a call handling disposition table 100, and a call log 98. Memory 30 may also store other operating parameters, such as pre-programmed start and stop times (depicted as entries 120 and 122) used by software component 82, 84, 86 or 88.

As will become apparent, control panel 20 under control of incoming call monitoring software component 84 may selectively block incoming calls, preventing telephones 22 from ringing; and control panel 20 may provide distinctive ringing or announce incoming calls, either at panel 20, or at interface 24, or at telephones 22. Control panel 20 may also log incoming call information.

In normal operation, switch 34 is closed, and subscriber line 13 is interconnected with feed 16, at panel 20. Telephones 22 are thus interconnected with subscriber line 13 and PSTN 12. Telephones 22 may thus place and receive calls by way of the PSTN 12, in a conventional manner.

Once the alarm system is armed, sensors 18 and control panel 20 also interact in a conventional manner. As a particular sensor 18 is tripped signifying a sensed condition, the sensor provides a signal to the control panel 20. Control panel 20, under software control, in turn, places a call to a pre-programmed telephone number to contact monitoring center 14, typically by way of PSTN 12, using DSP 37. In order to ensure that control panel 20 has unfettered access to PSTN subscriber line 13, the wired telephone feed 16 providing telephone signals to the remainder of premises 10 is disconnected from PSTN subscriber line 13, by switch 34, as control panel 20 originates a call. Outgoing call or calls to signal an alarm condition may be placed to a customer number, a monitoring center (like monitoring center 14), or any other alternate number, by dialling a stored PSTN telephone number. The PSTN telephone number(s) to be called (e.g. the number of monitoring center 14) may be pre-programmed by an administrator of control panel 20, and also stored within memory 30. Different sensed conditions may be associated with different PSTN number(s), thereby allowing different sensed conditions to be signalled to different monitoring stations, alternate numbers, or the like.

Once a pre-programmed number has been called, software within memory 30 generates a suitable message to the recipient using, for example, DSP 37. For example, in the event the number called is a subscriber number, the software may generate a voice message to be heard by the subscriber. If the called number is a monitoring center (such as monitoring center 14) data representative of the sensed alarm condition may be generated, encapsulated, and passed to the monitoring center. The data may be encapsulated using any one of a number of modulation techniques. For example, the data may be encapsulated using DTMF tones using the SIA protocol, as for example detailed in ANSI Standard SIA DC-03-1990.01 (R2000.11), or any other suitable signalling protocol, known to those of ordinary skill in the art. In the presence of an alternate network interface, a detected alarm condition could alternatively or additionally be signalled to monitoring center 14 by way of the additional or alternate network. Operation of panel 20 as a central alarm panel is controlled by alarm monitoring/notification software component 82.

Alarm system 40 may further enable residents at premises 10 to maintain a list of incoming telephone numbers from which calls are to be blocked or handled. As such, panel 20 may operate in a second mode, as an incoming call handling apparatus. As will become apparent, in its second mode, alarm system 40 may continue to monitor and signal alarm conditions sensed at sensors 18, as described. To facilitate operation as a call blocking apparatus, panel 20, includes incoming call monitoring/handling software 84 in memory 30, as detailed below, as well as a call disposition table 100 to maintain/store telephone numbers to be blocked, as illustrated in FIG. 5.

As illustrated, a suitable table 100 may include entries 102 of calling numbers to be blocked or otherwise handled by control panel 20. Optionally, each entry 102 of table 100 may include a phone number 104 of an incoming call to be handled, a start time 106, a stop time 108 for that phone number, and an optional action field 110, for that phone number. Phone number 104 identifies the calling number to be handled; start and stop times 106, 108 identify the time(s) during which an associated phone number 104 should be handled at panel 20. Field 110 identifies an action for the associated phone number 104. The action may include blocking an incoming call; generating a distinctive ring; or announcing the incoming call; or otherwise signalling the incoming call, as detailed below. Table 100 may be edited, for example, using one of interfaces 24, to add, delete or modify entries. Further, memory 30 may also include pre-programmed start and stop times (depicted as entries 120 and 122, respectively) for system 40 to operate in its second mode, as a call handling apparatus.

Figure 6:
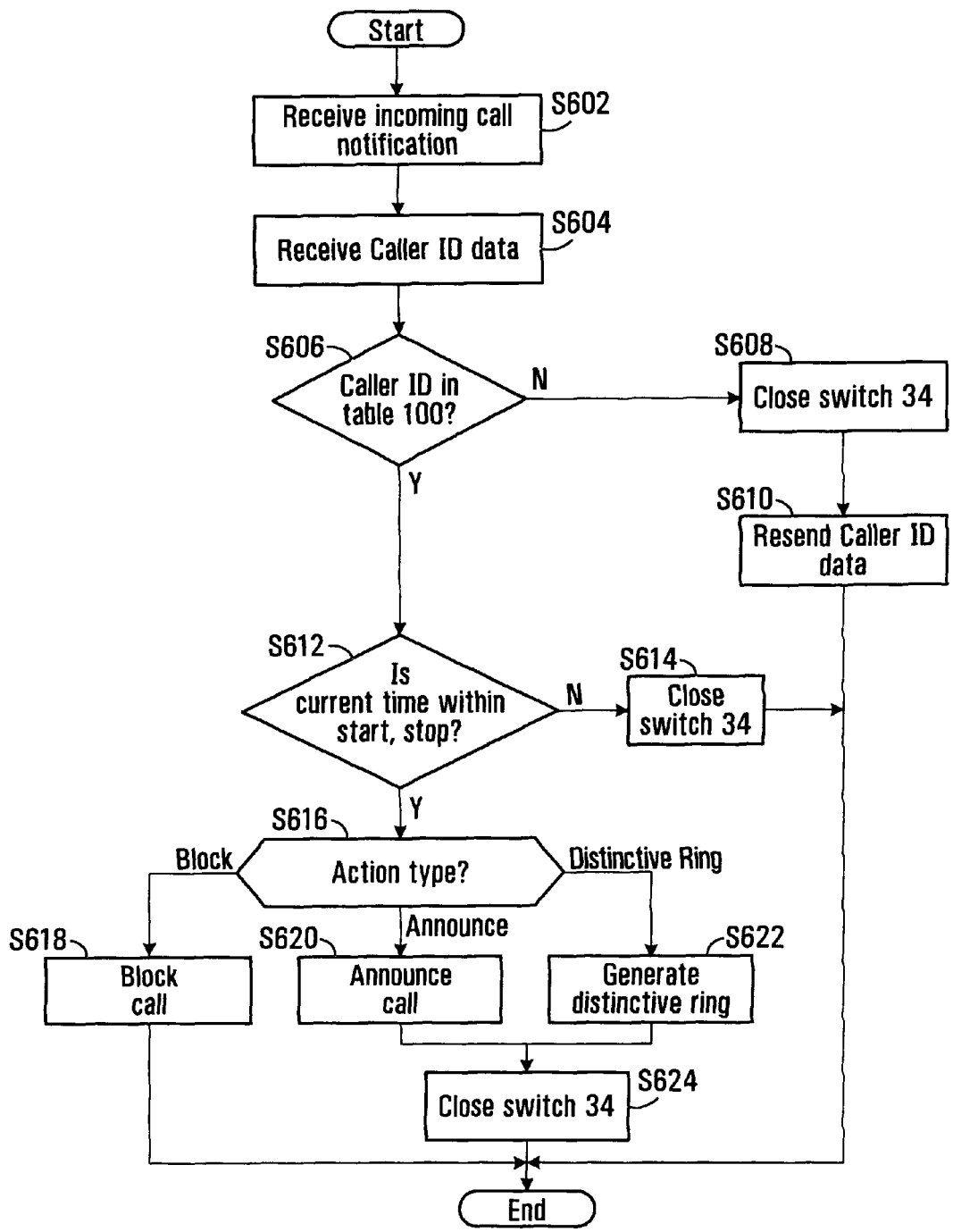
FIGS. 6 and 7 are flow charts, performed at the control panel of FIG. 2.

FIG. 6 shows the steps performed by processor 32 under control of incoming call monitoring/handling software component 84 in order to effect incoming call handling. Steps in FIG. 6 need only be performed between the start and stop times in entries 120 and 122, or when alarm system 40 is manually placed in this second mode. Prior to receipt of an incoming call, switch 34 is in its open state. Now, upon detecting the first ring signal of an incoming call on PSTN subscriber line 13, ring signal sensor 38 provides processor 32 with an indicator that an incoming call has been detected (step S602). Caller-ID decoder/encoder 39 decodes the caller-ID signal and provides the caller-ID data to processor 32, which is received in step S604. The caller-ID data may be buffered, in memory 30 or elsewhere for later use by processor 32. Next, the incoming telephone number is compared to phone numbers 104 in table 100 to determine whether the incoming call is to be handled in a defined manner by panel 20. Specifically, caller-ID data of the call is compared with phone number 104 for each entry in table 100. Optionally, numbers having common characteristics may be handled in a particular way. As such, phone number entries 104 of table 100 may include wild-cards (for example, identified by "?" or "*" symbols). In this way, all phone numbers having the same area code; or from the same exchange; or the like, may be handled in accordance with an entry in table 100. As well, all incoming calls could be blocked by panel 20, at particular pre-programmed times or dates.

If the caller ID does not match a number in table 100, as determined in step S606, processor 32 causes switch 34 to connect telephone feed 16 to PSTN subscriber line 13 in step S608. Conveniently, connection of telephone feed 16 to subscriber line 13 may be completed prior to the second ring of the incoming call being received, so that any of telephones 22 may receive the incoming call (including any associated ring signal). Optionally, after the second ring signal is received, processor 32 may cause ID decoder/encoder 39, to resend the caller-ID signal (step S610) on feed 16, using the buffered caller-ID data, so that any of telephones 22 may also display the incoming caller-ID information.

If the calling number information of the incoming call matches an entry in table 100, the call may be further processed by panel 20. In particular, the call may be blocked or announced, or a distinctive ring may be generated. The specific action taken by panel 20 to dispose of the call may be dictated by the "action" field 110 in table 100, corresponding to the calling phone number. In the example embodiment, the action may identify a distinctive ring (R1, R2, R3 . . . ); that the call should be announced (A); or that the call should be blocked (B). For example, the call could be announced at a speaker, or its caller-ID information displayed at interface 25, or distinctively signalled at an audible interface. Additionally, field 110 may indicate that receipt of the call should be signalled to an alternate telephone number, or signalled by way of alternate one of interfaces 24. For example, field 110 may indicate that receipt of the call should be signalled by flashing house lights, sounding an alarm, by way of an alternate network (such as the internet), or the like.

The action to be performed by panel 20 is determined in step S616 (shown in FIG. 6), after a determination has been made using clock 29, that the time is between start and stop times for that particular calling number, as determined in step S612. If the call arrives outside the specified time, switch 34 is closed and the call is allowed to ring at telephones 22 interconnected to feed 16 in step S608. Optionally, the caller-ID data may be resent on feed 16, as in step S610.

However, if the incoming call is to be blocked as determined in step S616, the call may simply not be answered by panel 20, or it may be answered, using DSP 37, and a pre-recorded message stating that the subscriber is not accepting the call may be generated by DSP 37 in step S618. Again the pre-recorded message may be stored in memory 30.

Optionally, when a blocked incoming call is answered, processor 30 may under control of incoming call monitoring/handling software component 84 monitor DTMF decoder 35 for tones entered by the far end caller. If the entered tones correspond to a pre-determined DTMF "code" chosen by the subscriber at premises 10, processor 30 may generate a ring signal on feed 16, using ring generator 31, and close switch 34 to complete the call once an off-hook condition is sensed by sensor 36. In this way, a subscriber at premises 10 may be able to place calls to premises 10, even when these are blocked.

Alternatively, if the caller-ID information is to be announced, as determined in step S616, the caller-ID information may be announced at one of input/output interfaces 24 using text to speech conversion software component 88, also stored in memory 30 in step S620. Text to speech conversion software component 88 may receive the caller-ID data provided by caller-ID decoder 39. In step S624 switch 34 may be closed, allowing the incoming call to ring at telephones 22 interconnected to feed 16.

If the incoming call is to generate a distinctive ring, as determined in step S616, distinctive ring generator software component 86 may generate a distinctive ring on feed 16 in step S622. The ring to be generated may be specified in field 110 of the associated call. Software component 86 may be capable of generating a number of pre-defined rings (identified as R1, R2 ... and so on in field 110), or may be extensible, capable of generating rings that may otherwise be loaded into memory 30. The distinctive ring may be generated at a speaker at panel 20, or one of interfaces 24, or another interface (not shown). Alternatively, ring generator 31 may generate a pre-programmed ring voltage on feed 16, to generate distinctive ring. Switch 34 need only be closed in step S624 once an off-hook state is detected by off-hook sensor 36.

Optionally, in addition to performing the actions in step S620 and S622, caller-ID data may be resent on feed 16, as in step S610. Alternatively, or additionally, received caller-ID data may be replaced or "spoofed" with preferred caller-ID information associated with the incoming telephone call. Data represented, replacement or preferred caller-ID information could additionally be stored in table 100, and if present sent on feed 16 to be passed to interconnected telephone devices, such as telephone 22, in place of received caller-ID data. For example, relatives and friends could be identified informally, by name or by other monikers. Phone numbers could be replaced and/or deleted.

Alternatively, the incoming call may be signalled as a bell/siren either at panel 20, or remote therefrom (e.g. by an audible signal generator formed as one of input/output interfaces 24, by way of power line control signals, or the like).

After switch 34 is closed, the incoming call may be answered at any of telephones 22, and completed in a conventional manner. After call completion, the telephone 22 may again be placed on-hook.

Figure 7:
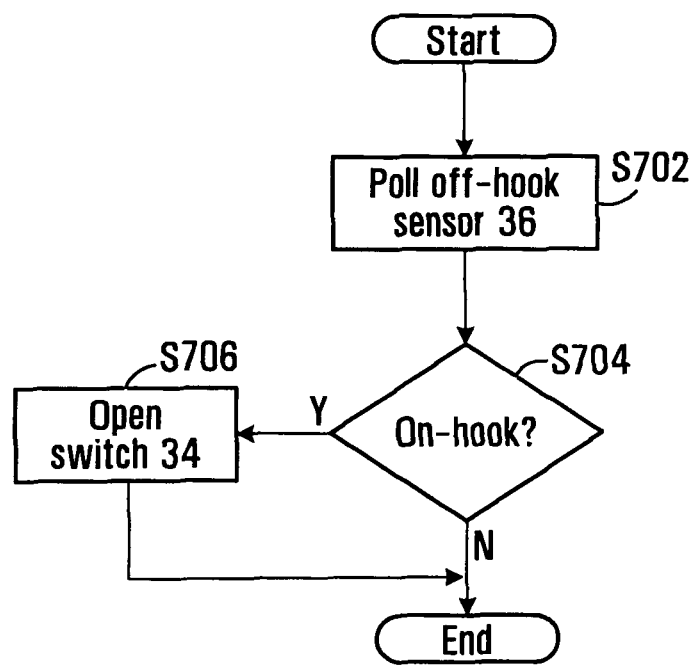

Periodically, incoming call monitoring/handling software component 84 may further poll off-hook sensor 36 in step S702, as illustrated in FIG. 7 to determine whether telephones 22 are still on-hook. If panel 20 remains in its second mode, incoming call monitoring/handling software component 84 may open switch 34 in step S706 once off-hook sensor 36 indicates that all telephones 22 are again on-hook, as determined in step S704.

Control panel 20 under control of incoming call monitoring/handling software component 84 may also optionally display caller-ID information after the first full ring of each incoming call. Control panel 20 may further maintain a call log with caller-ID information for each incoming call in log 98. Optionally, any logged calls could be displayed at interface 25. For example, logged calls could be displayed each time alarm system 40 is disarmed, allowing a user to see those that were received when system 40 was armed and the user likely away from premises 10. Alternatively or additionally, logged calls can be displayed at a users request, as signalled by interaction with interface 25.

If one of telephones 22 is placed off-hook when switch 34 is open, incoming call monitoring/handling software component 84 upon sensing the off-hook condition using sensor 36, may cause relay 34 to connect telephone feed 16 to PSTN subscriber line 13, thereby allowing an outgoing call to be placed.

Optionally, if an incoming call is currently being processed by telephone interface 28, while one of telephones 22 is placed in an off-hook condition, DSP 37 may generate a distinctive dial tone or voice prompt to be heard by the caller at the telephone 22, in order to handle the contention between the incoming and outgoing call. As well, if the incoming call is on the blocked list the distinctive tone would be omitted and the call handler would "flash" (e.g. connect and release) the PSTN subscriber line 13. This would hang up the inbound caller and give the outgoing caller a dial tone to place the outbound call. If the inbound call is not on the blocked list then a voice prompt, generated by DSP 37 could give the outbound caller at telephone 22 a choice to accept the call, causing the inbound calling party to be connected directly with no other annunciation, or to "flash" the inbound call and allow for an immediate dial tone for the outbound call. Again, processor 32 under software control may control operation of interface 28 to handle the race condition between incoming and outgoing calls.

Of course, any call monitoring functions may be overridden if the alarm needs to signal an alarm to monitoring center 14, while panel 20 is in its second state.

Conveniently, incorporating call handling features into alarm 10 allows the call monitoring features to be installed without requiring hardware at each telephone set 22. Moreover, only a single system needs to be installed for both selective call handling and alarm monitoring.

As will now be appreciated, although the above described embodiments provide certain selective call handling features at system 40, system 40 could easily be modified to provide other call handling features. For example, an answering machine could be incorporated in system 40, and calls could be selectively routed to the answering machine at system 40. Other call handling features will be apparent to those skilled in the art. For example, system 40 could be modified to place an outgoing call to a pre-programmed number after receipt of an incoming call, on the caller list. The pre-programmed number, and an action indicator identifying that this number should be called, could be stored as part of an entry identifying the incoming call. As well, any incoming call could be transferred or bridged to an alternate telephone interface, other than one of telephones 22. For example, if one of input/output interfaces 24 includes a speaker and microphone, the incoming call could be answered at telephone interface 34 and bridged to the capable input/output interface 24.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. An alarm system for use at a premises, said alarm system comprising:
    at least one sensor for sensing an alarm condition at the premises;
    a telephone network interface, for receiving a subscriber line from a telephone network, comprising:
        a caller-ID decoder for decoding caller-ID information from modulated caller-ID signals received on said subscriber line accompanying incoming telephone calls received on said subscriber line;
        a switch for selectively interconnecting said subscriber line to a telephone feed at said premises, said telephone feed at said premises interconnected with a plurality of telephone devices at said premises;
    at least one processor in communication with said caller-ID decoder, a caller-ID encoder to modulate caller-ID signals on said telephone feed at said premises to be decoded by said plurality of telephone devices at said premises; said caller-ID encoder and said switch to screen and selectively interconnect incoming telephone calls from said telephone network to said plurality of telephone devices at said premises using said switch, based on decoded caller-ID information, wherein said switch is held open to disconnect said plurality of telephone devices at said premises from said subscriber line while incoming telephone calls are screened and decoded caller-ID information is captured;
    wherein said at least one processor is further in communication with said at least one sensor, and is operable to disconnect said telephone feed from said subscriber line using said switch, and originate an outgoing telephone call over said telephone network to signal an alarm condition sensed at one of said at least one sensor at said premises over said telephone network to a monitoring station remote from said premises; and
    wherein said at least one processor is operable to cause said caller-ID encoder to modulate caller-ID information based on said decoded caller-ID information captured while said switch was held open, onto said telephone feed after said incoming telephone calls have been screened.

2. The alarm system of claim 1, further comprising a ring generator for generating distinct ring signals on said telephone feed in dependence on said caller-ID information.

3. The alarm system of claim 1, further comprising an audible signal generator for generating audible signals in dependence on said caller-ID information.

4. The alarm system of claim 1, further comprising a display operable to display said caller-ID information.

5. The alarm system of claim 1, further comprising memory in communication with said at least one processor, said memory storing caller-ID data corresponding to incoming calls to be selectively handled at said alarm system.

6. The alarm system of claim 5, further.comprising a display operable to display said caller-ID information and wherein said at least one processor causes caller-ID information logged to be displayed when said system is disarmed.

7. The alarm system of claim 1, further comprising an off-hook sensor for sensing an off-hook condition of telephones connected with said telephone feed, when said subscriber line is disconnected from said telephone feed.

8. The alarm system of claim 7, wherein said off-hook sensor comprises a current source, and a current detector.

9. The alarm system of claim 1, further comprising a digital signal processor for announcing an incoming call has been blocked, to a caller.

10. The alarm system of claim 1, further comprising a software component for announcing an incoming call.

11. The alarm system of claim 5, wherein said memory stores data representing replacement caller-ID information to be passed to an interconnected telephone device in place of received caller-ID information, for incoming calls to be selectively handled at said alarm system.

12. A method of operating at an alarm system at a premises, said alarm system comprising sensors at the premises, and said alarm system interconnected with a telephone network and a telephone feed to said premises, said telephone feed at said premises interconnected with a plurality of telephone devices at said premises, said method comprising:
    monitoring sensors to sense alarm conditions at the premises;
    receiving, at said alarm system, an incoming telephone call from said telephone network;
    decoding, at said alarm system, caller-ID data associated with said telephone call from a modulated caller-ID signal received from said telephone network with said call;
    determining, at said alarm system, how to handle said call, based on said caller-ID data, wherein said telephone feed at said premises is held disconnected from said telephone network during said determining;
    in response to said determining, handling said call at said alarm system, to selectively interconnect calls to said plurality of telephone devices at said premises, and to modulate caller-ID signals based on decoded caller-ID data on said telephone feed at said premises to be decoded by said plurality of telephone devices at said premises, for calls interconnected to said plurality of telephone devices at said premises;
    in response to sensing an alarm condition at one of said sensors, disconnecting said telephone feed from said telephone network and originating an outgoing telephone call over said telephone network to signal an alarm condition at said premises over said telephone network to a monitoring station remote from said premises.

13. The method of claim 12, wherein said determining comprises determining said call is to be prevented from ringing at said premises, and said handling comprises preventing said call from ringing at said plurality of telephone devices interconnected with said feed.

14. The method of claim 13, wherein said determining comprises comparing said caller-ID data to stored caller-ID data of callers from whom incoming calls are to be blocked.

15. The method of claim 13, wherein said preventing comprises keeping a switch from interconnecting said feed to said telephone network.

16. The method of claim 13, wherein said determining comprises determining that said call is to be signalled using a distinctive ring, and wherein said handling comprises generating a distinctive ring at telephone devices interconnected to said feed.

17. The method of claim 13, wherein said determining comprises determining that said call is to be signalled using an announcement of said call, and wherein said handling comprises audibly announcing said call.

18. The alarm system of claim 1, wherein said caller-ID signals modulated by said caller-ID encoder encode said decoded caller-ID information.

19. The alarin system of claim 11, wherein said caller-ID signals modulated by said caller-ID encoder encode said replacement caller-ID information.

* * * * *

UNITED STATES PATENT AND TRADEMARK OFFICE
CERTIFICATE OF CORRECTION

PATENT NO.        : 9,241,075 B2
APPLICATION NO.   : 12/738503
DATED             : January 19, 2016
INVENTOR(S)       : Dwayne Arthur Bell It is certified that error appears in the above-identified patent and that said Letters Patent is hereby corrected as shown below:

In the Claims

Claim 6, column 9, line 66 "further.comprising" should read --further comprising--

Claim 19, column 11, line 8 "alarin" should read --alarm--

Signed and Sealed this
Twenty-third Day of August, 2016

Michelle K. Lee
*Director of the United States Patent and Trademark Office*